(12) United States Patent
Bahl et al.

(10) Patent No.: US 8,234,303 B2
(45) Date of Patent: Jul. 31, 2012

(54) SINGLE PARSE, DIAGRAM-ASSISTED IMPORT INTO A UNIFIED MODELING LANGUAGE BASED META-MODEL

(75) Inventors: Rohit Bahl, Ontario (CA); Keith Walter Campbell, Ontario (CA); Alan Yeung, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/631,416

(22) Filed: Dec. 4, 2009

(65) Prior Publication Data

US 2011/0137915 A1 Jun. 9, 2011

(51) Int. Cl.
*G06F 7/00* (2006.01)
(52) U.S. Cl. ........................................ 707/786
(58) Field of Classification Search .............. 707/786, 707/707, 610
See application file for complete search history.

(56) References Cited

U.S. PATENT DOCUMENTS
2005/0097146 A1* 5/2005 Konstantinou et al. ....... 707/200

FOREIGN PATENT DOCUMENTS
JP 2006338303 A 12/2006
* cited by examiner

*Primary Examiner* — Truong Vo
(74) *Attorney, Agent, or Firm* — Holland & Knight LLP; Brian J Colandreo, Esq.; Michael T. Abramson, Esq.

(57) ABSTRACT

Systems and methods for conversion and importation of models that describe system behavior into a UML meta model-based representation, include parsing through the textual model for the plurality of elements, searching for an element semantic definition, element view definitions corresponding to a semantic definition, or an element view containing diagram definition within the textual model for each of the plurality of elements, generating element reference nodes for placement on an internally constructed custom tree, attaching a listener to each of the element reference nodes, wherein the listener is configured to await population of the element reference node with an equivalent unified modeling language semantic element, wherein a listener awaiting population is an awaiting sequenced listener, completing an inheritance hierarchy between the element reference nodes up to a parent node inferred from the diagramming definitions and resolving awaiting sequenced listeners that are made aware of an awaited unified modeling language value.

20 Claims, 11 Drawing Sheets

100

SINGLE PARSE, DIAGRAM-ASSISTED IMPORT INTO A UNIFIED MODELING LANGUAGE BASED META-MODEL

BACKGROUND

The present invention relates to models that describe system behavior, and more specifically, to conversion and importation of models that describe system behavior into a Unified Modeling Language (UML) meta model-based representation.

UML is implemented to specify, visualize, modify, construct and document artifacts of an object-oriented software intensive system under development. UML offers a standard way to visualize a system's architectural blueprints, including elements such as: actors; business processes; (logical) components; activities; programming language statements; database schemas; and reusable software components. Managing import of textually represented models described by its inter dependent constituent elements into a UML-based model representation can include data being represented by a model that implements nesting of data elements one within another (i.e., containment hierarchy) as well as inheritance between these elements (i.e., logical inheritance hierarchy). The management of the import of textually represented models can be difficult because it is desirable for the import to have a conservative memory footprint as well as an acceptable time for completion.

SUMMARY

Exemplary embodiments include a method for inputting a textual model having a plurality of elements, the method including parsing through the textual model for the plurality of elements, searching for at least one of an element semantic definition, one or more element view definitions corresponding to a semantic definition, and an element view containing diagram definition within the textual model for each of the plurality of elements, generating element reference nodes for placement on an internally constructed custom tree, attaching a listener to each of the element reference nodes, wherein the listener is configured to await population of the element reference node with an equivalent unified modeling language semantic element, wherein a listener awaiting population is an awaiting sequenced listener, completing an inheritance hierarchy between the element reference nodes up to a parent node inferred from the diagramming definitions and resolving awaiting sequenced listeners that are made aware of an awaited unified modeling language value, including dynamically resolving views prior to semantic completion.

Additional exemplary embodiments include a computer program product for inputting a textual model having a plurality of elements, the computer program product including instructions for causing a computer to implement a method, the method including parsing through the textual model for the plurality of elements, searching for at least one of an element semantic definition, one or more element view definitions corresponding to a semantic definition, and an element view containing diagram definition within the textual model for each of the plurality of elements, generating element reference nodes for placement on an internally constructed custom tree, attaching a listener to each of the element reference nodes, wherein the listener is configured to await population of the element reference node with an equivalent unified modeling language semantic element, wherein a listener awaiting population is an awaiting sequenced listener, completing an inheritance hierarchy between the element reference nodes up to a parent node inferred from the diagramming definitions and resolving awaiting sequenced listeners that are made aware of an awaited unified modeling language value, including dynamically resolving views prior to semantic completion.

Further exemplary embodiments include a system for inputting a textual model having a plurality of elements, the system including a processor configured to parse through the textual model for the plurality of elements, search for at least one of an element semantic definition, one or more element view definitions corresponding to a semantic definition, and an element view containing diagram definition within the textual model for each of the plurality of elements, generate element reference nodes for placement on an internally constructed custom tree, attaching a listener to each of the element reference nodes, wherein the listener is configured to await population of the element reference node with an equivalent unified modeling language semantic element, wherein a listener awaiting population is an awaiting sequenced listener, complete an inheritance hierarchy between the element reference nodes up to a parent node inferred from the diagramming definitions and resolve awaiting sequenced listeners that are made aware of an awaited unified modeling language value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
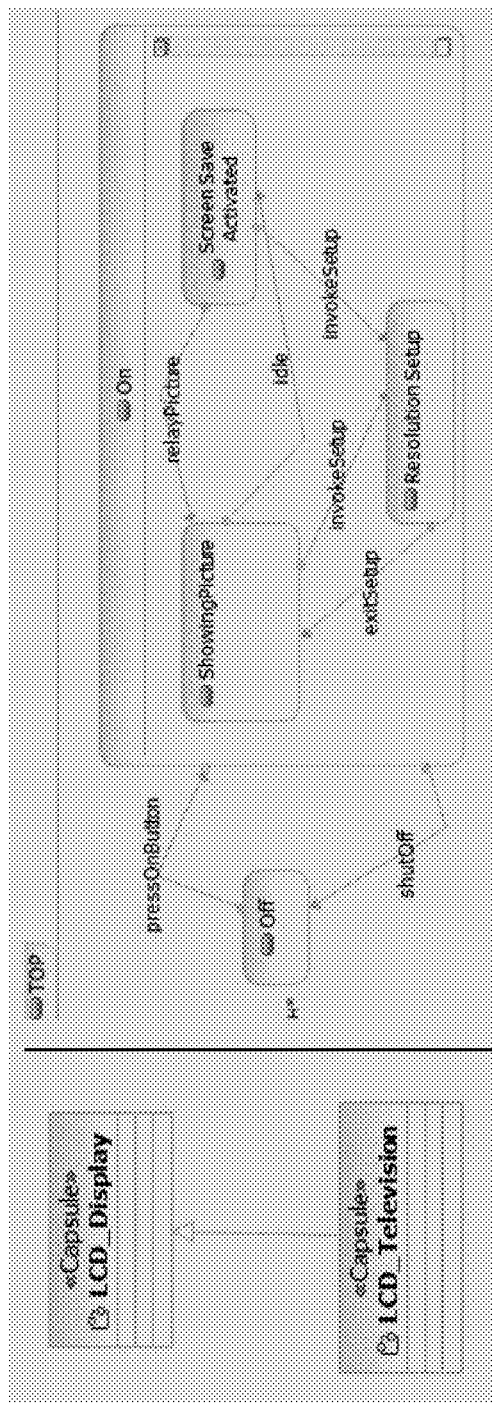
FIG. 1 illustrates a diagram of an example of containment hierarchy.
Figure 2:
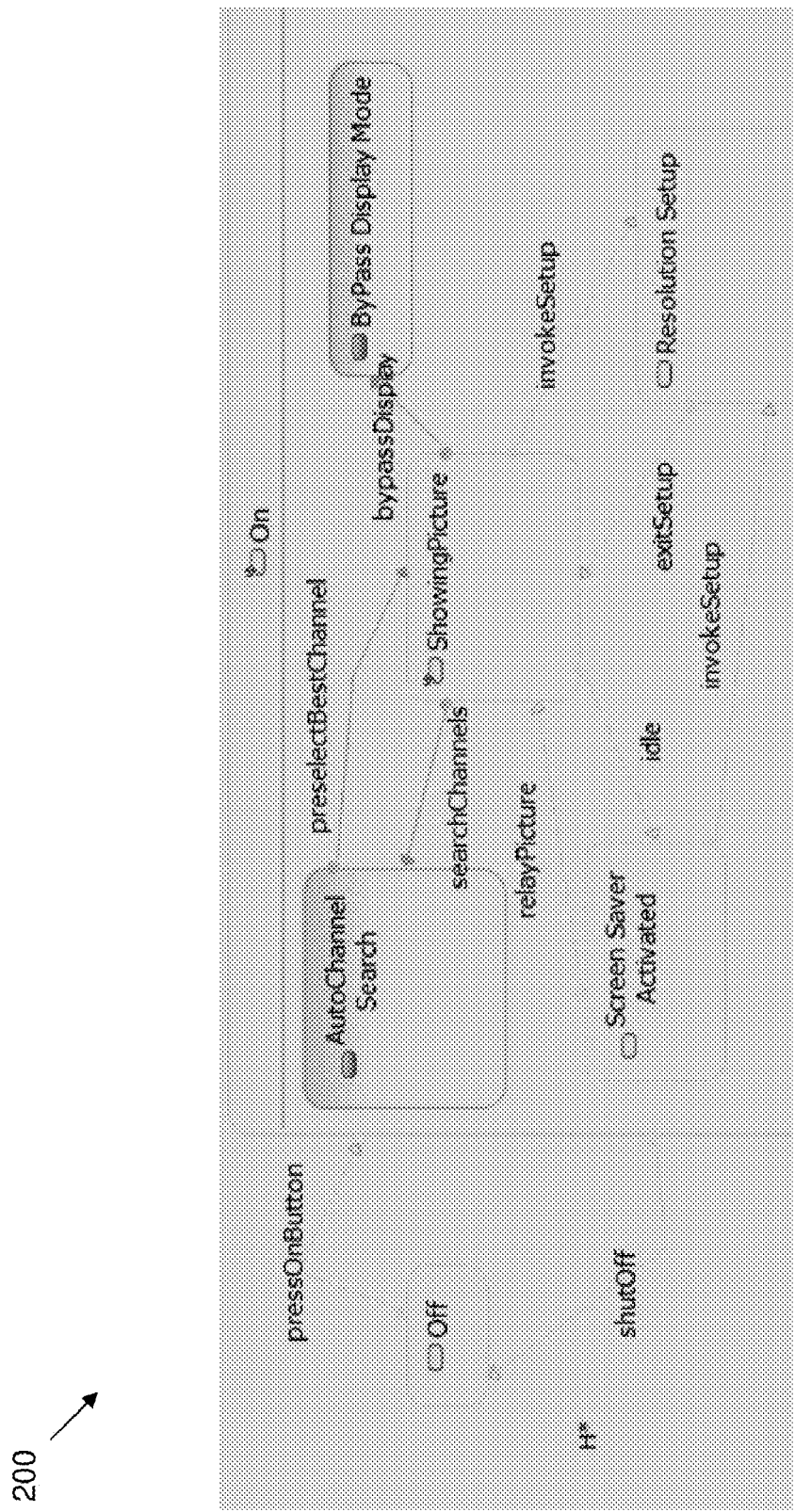
FIG. 2 illustrates a diagram of an example of redefinition.

As described herein, the management of the import of textually represented models can be difficult. In one example, the behavior of an LCD Display implementing State Machines can be modeled. FIG. 1 illustrates a diagram 100 of an example of containment hierarchy. The example exhibits containment hierarchy (i.e., between states and nested states), which is implemented to describe the behavior of an LCD Display. The principal states can be "On" or "Off", which can further have nested states (e.g., "On" can have sub states such as "Showing picture", "Resolution Setup", "Screen saver activated"). Furthermore, another Class named LCD Television that specializes LCD Display can also exist. An inheritance hierarchy is demonstrated in this architecture since an LCD Television inherits behavior of an LCD Display, although it includes more functionality. The model can further include "redefinition", in which an inherited state can be redefined to have complementary behavior in the sub-Class. FIG. 2 illustrates a diagram 200 of an example of redefinition. As an example, the inherited "On" state from the LCD Display is redefined in its subclass (e.g., LCD Television to add additional states such as "auto channel search", "bypass display mode", "display channel info"). As such, diagramming information is also present that pertains to visualizing shapes used to describe behavior of the LCD Television.

Figure 3:
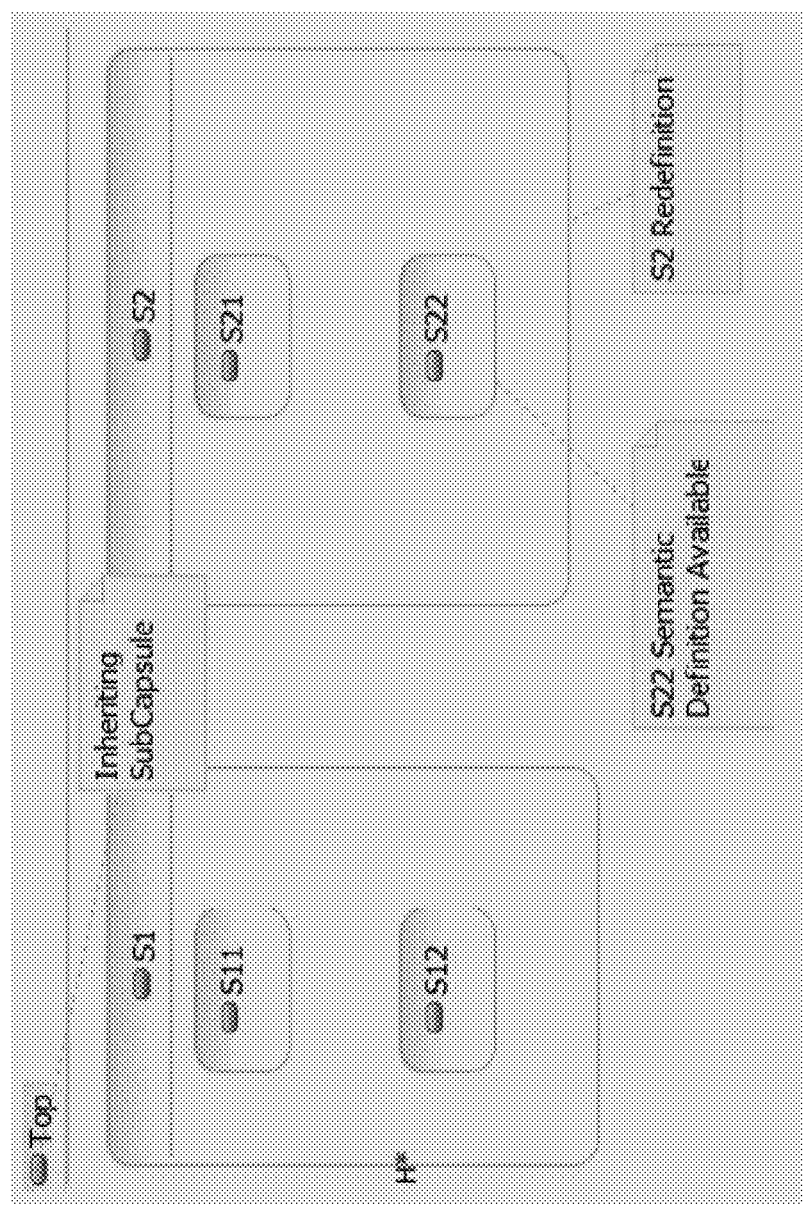
FIG. 3 illustrates a diagram of an example in which semantic information is unavailable.

Therefore, in the modeling domain, models can have semantic definition and diagram definition available and often defined separately from one another. Importing such models can include the following generic constraints characterizing such models, which can create importation problems: 1) The input model is structured and consequently conforms to an ordered containment hierarchy; hence a nested element cannot be imported unless its container has been imported. 2) The input model does not respect logical hierarchy for inheritance. Hence it is common to have a subclass definition appear prior to the parent class in an n-level deep hierarchy. A manifestation of the sequence in which the classes are created using the tooling. 3) The inheritance chain can be broken/incomplete prior to reaching end of parsing of the input model because of encountering the unordered definitions of classes and their subclasses. Consequently, prior to reaching the end of the input model, discovery of referred inherited elements is difficult. 4) Every element's definition is divided into two parts. The semantic definition describing the element it is modeling and a diagram definition describing the element on a diagram. 5) In the case of state machines of sub capsules, only information regarding newly added elements in the context of the sub capsule is typically available. As such, diagram information can be available, but the semantic information of inherited states is unavailable in that context. FIG. 3 illustrates a diagram 300 of an example in which semantic information is unavailable. For example, there can be inherited States named S1 & S2 in a sub capsule. S2 includes nested states of which S21 is inherited but S22 is a new state defined within S2 in the context of the sub-capsule. In addition, nested states S12 and S11 can be both inherited and nested within the inherited state S1. In addition, there is diagramming information for the newly added state S22, its neighbors sharing the diagram, which in this case is S21, as well as it parent state diagram that mentions S2 and S1. Since S1's nested states have not been redefined, they do not have a mention in the context of the sub capsule. Furthermore, the only semantic definitions present in the context of the sub capsule is the redefinition of S2 and the semantic definition of S22. Therefore, semantic definition is missing for element represented via diagrams and in this case S1 and S21.

In exemplary embodiments, the systems and methods described herein manage and model the behavior of the import of textually represented models described by interdependent constituent elements into a UML-based model representation. Represented data can include nesting of data elements one within another (i.e., containment hierarchy) as well as inheritance between these elements (i.e., logical inheritance hierarchy). As such, the exemplary embodiments described herein can manage and import input models that are textual with constituent elements identified by partially qualified names or simple names. The exemplary embodiments described herein can further manage and import input models in which there is no unique id or absolute location in the inheritance hierarchy of the element it is redefining. As such, the systems and methods described herein address a redefinition that could refer to its absolute super rather than its immediate super element, even though it is required to redefine its immediate super element, which is actually implied. The exemplary embodiments described herein can further manage and import input models in which there is no unique id or absolute location in the inheritance hierarchy of the element it requires for binding to a shape on the diagram (e.g., a UML State corresponding to its figure on a State Diagram).

The exemplary embodiments described herein therefore can be applied to the domain of importing models to UML (e.g., UML 2.1) from any textual representation that suffer from the characteristic of having a non-unique non-absolute naming convention used for naming elements in the definition as well as in the references. In exemplary embodiments, to complete an inheritance hierarchy between sub element placeholders (which serves as proxies) and super element placeholders, references in diagramming information are implemented. In the prior art, redefinition and semantic definitions are typically implemented to complete the inheritance hierarchy. Furthermore, a redefinition listener is attached to an awaiting element reference in its own context. Hence the diagram references drive the inheritance hierarchy rather than the semantic definitions as in the prior art where redefinition listeners (i.e., resolvers) are attached to the supplier element that it is redefining as mentioned in the semantic definition for this redefinition.

In exemplary embodiments, an Element Reference Framework (ERF) is implemented to resolve inter reference resolution during import. The ERF implements a single parse, tree structured element reference resolution methodology. The input model is parsed through once, creating placeholders/proxies (referred to as Element Reference Nodes) in an internal data structure when a reference to the internal data structure is encountered. The internal data structure is accordingly populated with an appropriate UML element when a corresponding semantic definition is encountered. Partially qualified named, simple named as well as absolute named references are all handled generically by conforming them to the tree structure. On finding a semantic definition for an element, if its pre-requisites are met, such as availability of container, availability of super element (in case of inheritance) that is redefined, an equivalent UML element is created. In addition the Element Reference Node is populated. If the element is unavailable, the referencer for the element is attached as a listener (resolver) awaiting the UML Element to be set in the proxy placeholder.

In exemplary embodiments, the ERF produces a single tree structure with nodes corresponding to the semantics of the imported model, with each of these element reference nodes positioned in accordance with the containment hierarchy. Furthermore the logical hierarchy information is preserved in each of these nodes with the uniqueness of the completed node having a link to its parent in the inheritance hierarchy as well as a list of children specializing from it. Furthermore the diagram definitions which contain a list of element views with corresponding reference to the semantic definitions assist in driving this linkability between the nodes from the inheritance point of view. In addition, strict control ensures that the parent views are resolved prior to the inheriting child views. As such, the ERF has several characteristics. In exemplary embodiments, the ERF implements diagram-driven semantic completion in which diagramming artifacts are implemented to complete semantic elements. In addition, the ERF builds a tree structure of semantic elements. As such, the ERF positions semantic elements implementing qualified names, and further implements multi-valued hash keys for increased look up performance. The ERF also implements prioritized reference resolution, which allows subclass references resolutions before base class semantic completion. Prioritized reference resolution also prioritizes container resolution prior to containing element resolution. Prioritized reference resolution enables subclasses from having to await base class resolution completion. The ERF also implements diagram view resolution prior to semantic model completion, with single parsing of model artifacts.

In exemplary embodiments, diagrams are strongly leveraged off as in the case of Capsules, since diagrams contain a mention of the element redefined as well as newly added elements, along with other inherited elements that share the diagram with these elements. Hence it greatly assists in completing the logical hierarchy (inheritance chain) dynamically during parsing the unordered generalizations encountered. As described herein, the systems and methods described herein leverage references to corresponding semantic elements in the diagram definitions to create a proxy placeholder.

In exemplary embodiments, the systems and methods described herein implement an ERF Engine to execute the inter reference methodologies described herein. As described further herein, the ERF Engine can be implemented by various languages and platforms. In addition, the parser can be employed for a single read of the textual input model implementing various development environments. The output model produced can be defined implementing XMI based UML meta-model.

Figure 4:
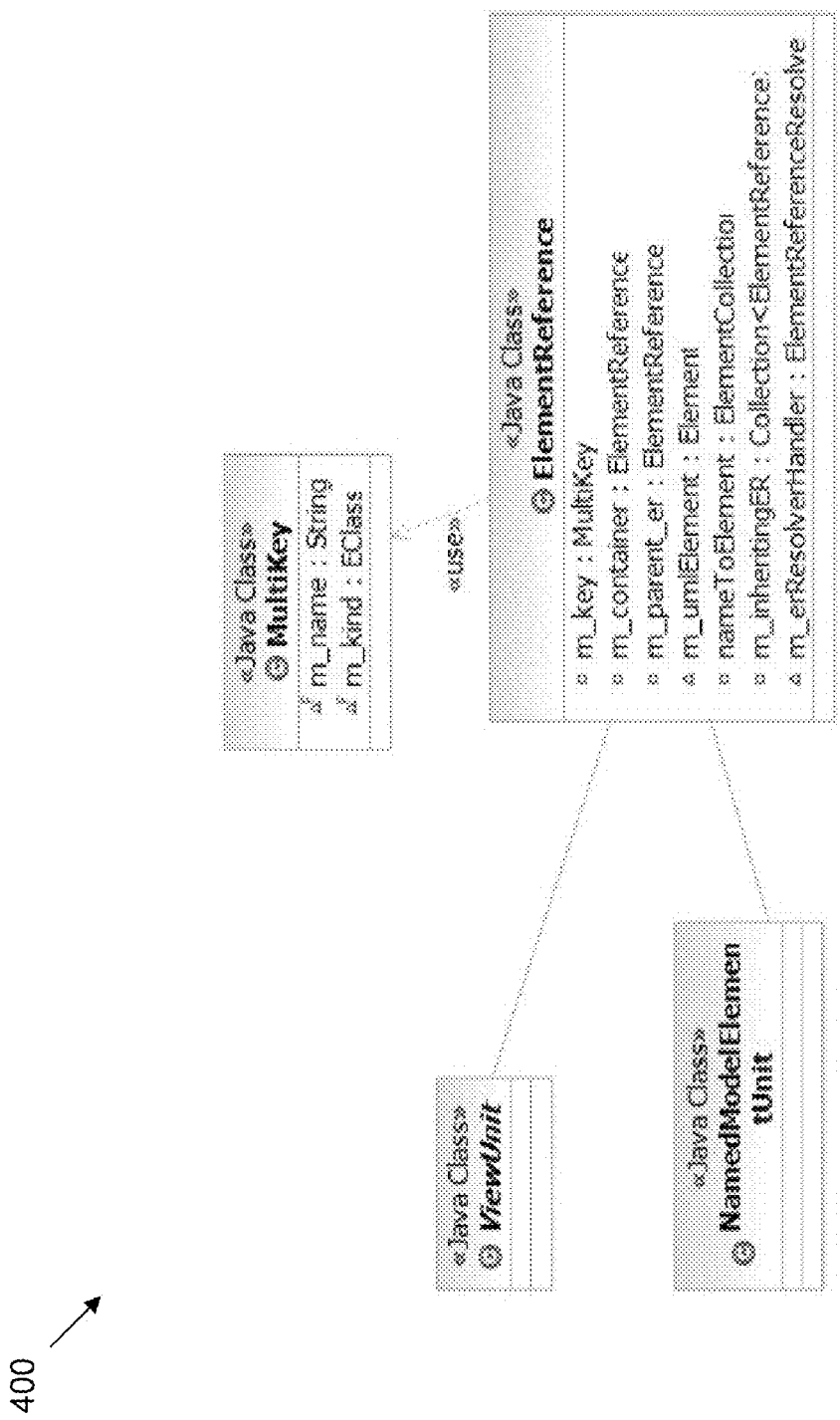
FIG. 4 illustrates Class Diagram of components of the Element Reference Framework in accordance with exemplary embodiments.

In exemplary embodiments, there are several components implemented in the ERF. FIG. 4 illustrates Class Diagram 400 of components of the ERF in accordance with exemplary embodiments. In exemplary embodiments, temporary data structures are created to capture information of input elements encountered during the parse, which are now described. NamedModelElementUnit (and its subclasses) contain semantic information of elements that are to be imported into UML elements, and captured during parsing. ViewUnit (and its subclasses) similarly capture and contain the diagramming information encountered during import. RootElementReference (itself a subclass of ElementReference) is the root node in the hierarchical tree structure. ElementReference is involved with reference resolution, and serves as a node in a hierarchical tree like structure. As nested element definitions in the textual input model are encountered, the nested element definitions are captured in NamedModelElementUnits and the NamedModelElementUnits further create ElementReference instances contained one within another preserving the containment of the input elements. Hence, ElementReferences are not only created when we encounter a semantic definition for an element in the input model but also when the input model's element is referencing an element. Hence in this case we create an ElementReference for the reference, thus its acting as a placeholder node in the hierarchical tree structure. MultiKey provides uniqueness to an ElementReference in a particular context. Each ElementReference is therefore unique in a particular context, since its identity is an aggregate of it simple name and type of UML element to be created.

In exemplary embodiments, the ElementReference node can include several fields, including, but not limited to: m_nameToElement, which maintains the containment hierarchy between nested elements, has a map keyed on unique ids storing a collection of all nested elements; m_parent_er, which maintains the logical inheritance hierarchy between elements, keep a reference to its super element; M_inheritingER, which maintains the logical hierarchy between elements, stores a list of all the sub elements that would have this element as it super in an inheritance hierarchy; m_umlElement, which is an imported UML 2.1 element corresponding to the element represented by this ElementReference; and m_erResolverHandler, in which, in situations whenever the ElementReference is treated as a placeholder, the referencer waiting for the imported UML 2.1 element is added to this collection. Once the m_umlElement becomes available these referencers are invoked to complete their processing.

In exemplary embodiments, the input model's elements can have a naming convention. Names can be mentioned either during definition of elements or as a referencee. There are three types of mentions to an element in the input model, including, but not limited to: 1) Fully qualified name (i.e., iteratively ElementReference Nodes are created for each segment, starting at the RootElementReference); 2) Partially qualified name, which includes setting a particular ElementReference node as the starting point (contextual) and then creating further ElementReferences for each of the segments iteratively; and 3) Simple name, which can be a considered a restrictive subset of the Partially qualified name convention, and common as diagramming information. As such, the containment hierarchy of ViewUnits is mapped to the containment hierarchy of the ElementReference Nodes, to discover or create the place holder for the Simple name.

Figure 5:
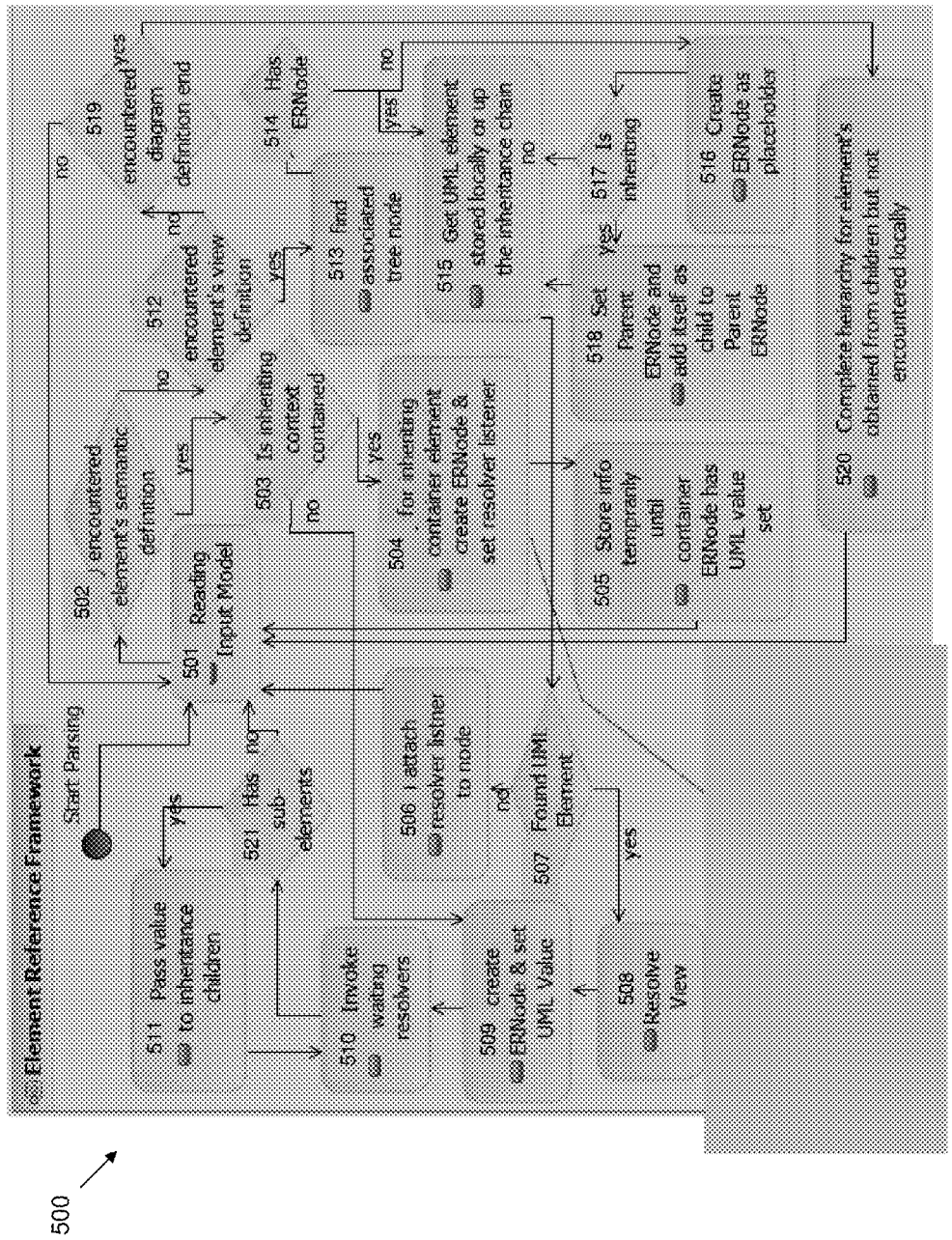
FIG. 5 illustrates a flow chart for a method for resolving inter reference resolution in accordance with exemplary embodiments.

FIG. 5 illustrates a flow chart for a method 500 for resolving inter reference resolution in accordance with exemplary embodiments. FIG. 5 illustrates how the ERF attempts to resolve inter reference resolution during import with just a single parse/read through the input model. At block 501, the ERF reads a textual input model, element by element. Block 501 is handled by the parser and generates instances of NameModelElementUnit (i.e., to capture semantic definition) and ViewUnit (i.e., to capture diagramming information). In exemplary embodiments, as described herein, as the ERF is reading the textual input model, it can encounter semantic definitions and diagramming information (i.e., view definitions). At block, 502, the ERF determines if it has encountered an element semantic definition from the input model. If at block 503, the ERF has determined that it has encountered an element semantic definition, then at block 503, the ERF determines whether the element semantic definition contains inheriting context. If at block 503, the element semantic definition does contain inheriting context, then the inheriting context implies that the element whose definition that the ERF encountered is contained directly or indirectly within an inheriting context (e.g., a newly created state element defined in an inheriting Capsule). At block 504, the ERF creates an Element Reference Node and sets a resolver fastener. A nested element cannot be created unless its containing redefining element (inheriting element) is available. Therefore, a placeholder is generated (i.e. an ElementReference) awaiting the inheriting element, and a resolver that would handle redefinition is added. In addition, the ERF further processes the nested elements within the Element Reference Node. In certain situations, even though the inherited element might be available, the ERF waits for the diagramming information associated with the inheriting element, since the diagramming information completes the inheritance hierarchy and presents the inherited element for redefinition and subsequently as a container for these newly defined contained elements. As such, a semantic definition in an inheriting context creates a listener because the inheriting context is dependent on the diagramming information to make it aware of its super element.

At block 505, the ERF stores the nested elements encountered while parsing the semantic definition in temporary units, to resume processing once the containing inheriting element is available. The information is stored into the container Element Reference Node includes a UML value set. The referencer looks for the referencee imported UML element. At block 507, the ERF determines whether the references has found the UML element. If at block 507, the referencer has not found the UML elements, then at block 506, the ERF attached a resolver listener to the Element Reference Node. If at block 507, the referencer has found the UML elements, then at block 508, the ERF resolves the view. In exemplary embodiments, view resolution is implemented whenever the diagramming information associated with an element is encountered. If the information from the ElementReference associated with element is obtained, the view is resolved. If the element is obtained from the super ElementReference node; the associated ElementReference is generated and the m_umlElement is populated, which triggers invocation of the rest of the awaiting resolvers that are also resolved. As such, at block 509, the ERF generated the Element Reference Node and sets the UML value.

In addition, once the m_umlElement is populated, it can proceed with whatever resolution it needs to complete. Furthermore, if at block 503, the semantic definition is found not to be contained in an inheriting context, the ERF generates the Element Reference Node and sets the UML value at block 509. Then at block 510, the ERF invokes the waiting resolvers as described herein. At block 521, the ERF determines if there are any sub elements. If there are sub elements at block 521, then at block 511, the ERF passes value inheritance to the sub elements (i.e., children). As such, the ERF passes the imported UML element down the inheritance hierarchy to the sub elements, which can in turn call their own resolvers awaiting this element. If at block 521, there are no sub elements, then at block 501 the method 500 continues.

If at block 502, the ERF has not encountered an element semantic definition, then at block 512 the ERF determines if the element's view definition has been encountered. As described herein, semantic definition and diagramming definition of elements are separated in the textual input model. If at block 512, the ERF encounters a view definition, then at block 513, the ERF finds an associated tree node. In exemplary embodiments, finding the associated tree node involves finding an ElementReference node in the hierarchical tree structure. Finding strategy depends on what naming convention is used for the element being searched, which involves walking the ElementReference tree hierarchy where every element is uniquely defined by the MultiKey.

At block 514, the ERF determines if there is an Element Reference Node. If there is an Element Reference Node at block 514, then at block 515, the ERF obtains the UML element stored locally or up the inheritance chain. The method 500 then continues at block 507. If at block 514, there is no Element Reference Node, then at block 516 the ERF generates an Element Reference Node as a placeholder.

At block 517, the ERF determines if the element is contained in the Element Reference Node in an inheriting context. If the element is contained in an inheriting context, then at block 518, the ERF sets the parent Element Reference Node and adds the Element Reference Node as a child to the parent Element Reference Node, and the method 500 continues at block 515. If the element is not contained in an inheriting context at block 517, then the method continues at block 515. As such, if the element is contained in an inheriting context, its parent ElementReference is set and it is added to the list of children to its super children list.

At block 512, if the ERF has not encountered a view definition, then at block 519, the ERF determines if it has encountered diagram information. If the ERF encounters diagramming information at block 519, then at block 520, the ERF completes the hierarchy for the elements obtained from children, but not encountered locally. The method then continues at block 501. If no diagramming information is encountered at block 519, then the method 500 continues at block 501. In exemplary embodiments, diagrams contain nested diagrams, and consequently a diagram contains all elements in the locality of the redefinition. Therefore it is possible that some ElementReference whose presence is learned from sub elements were not present as nested element in this context. As such, the method 500 passes the elements up the inheritance chain to the super, to complete the inheritance chain for these sub elements which were ignored during diagram parsing since their views were never locally encountered.

EXAMPLE

In the example, diagrams are illustrated explaining the single parse import using diagram assistance. In the example, the ERF Engine can be implemented in JAVA and can be built on the eclipse platform. In other exemplary embodiments, the ERF can be implemented in other languages and platforms. The parser can be employed for a single read of the textual input model implementing Rational Rose Real Time. The output model produced is defined using XMI based UML2.1 meta-model and consumable by Rational Software Architect.

Figure 6:
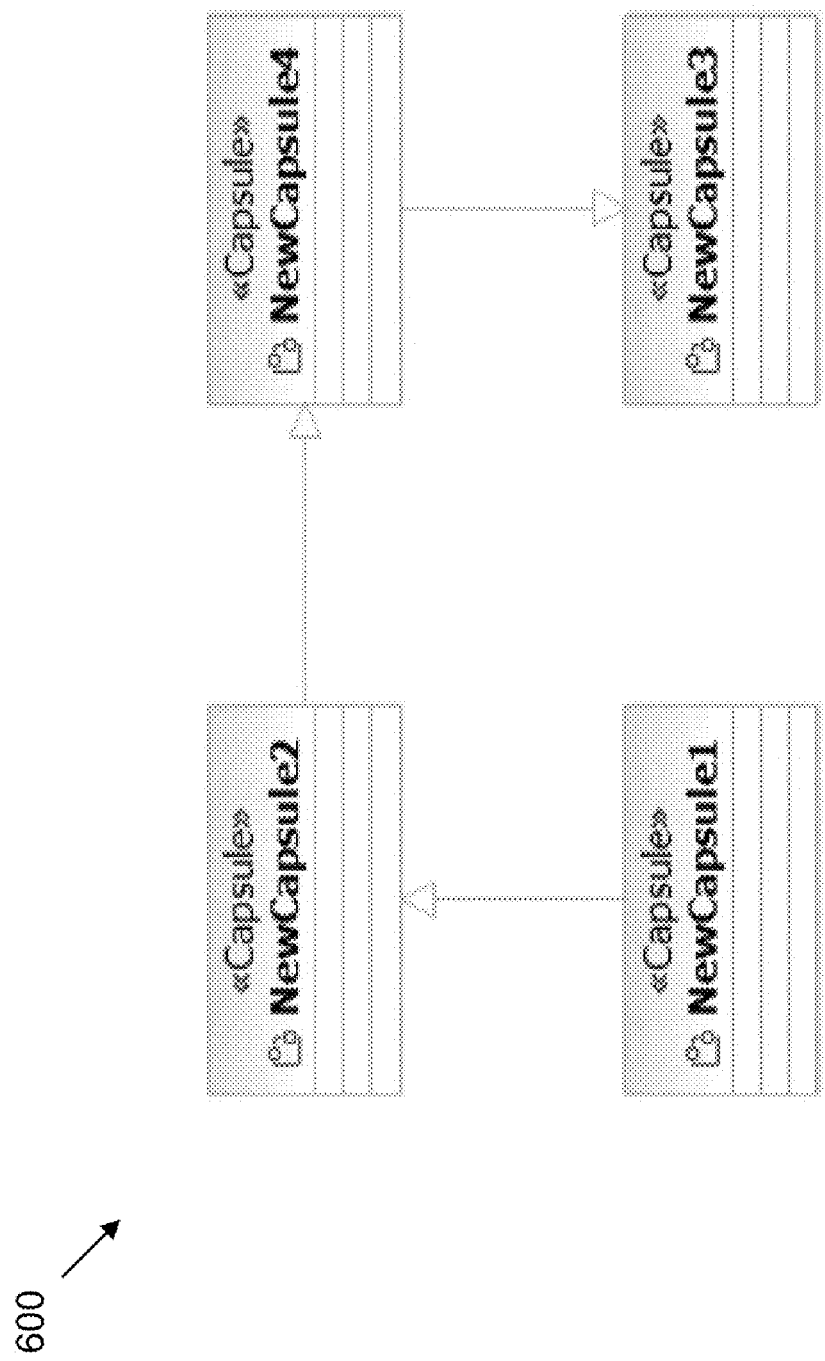
FIG. 6 illustrates a class diagram of an example textual input model.
Figure 7:
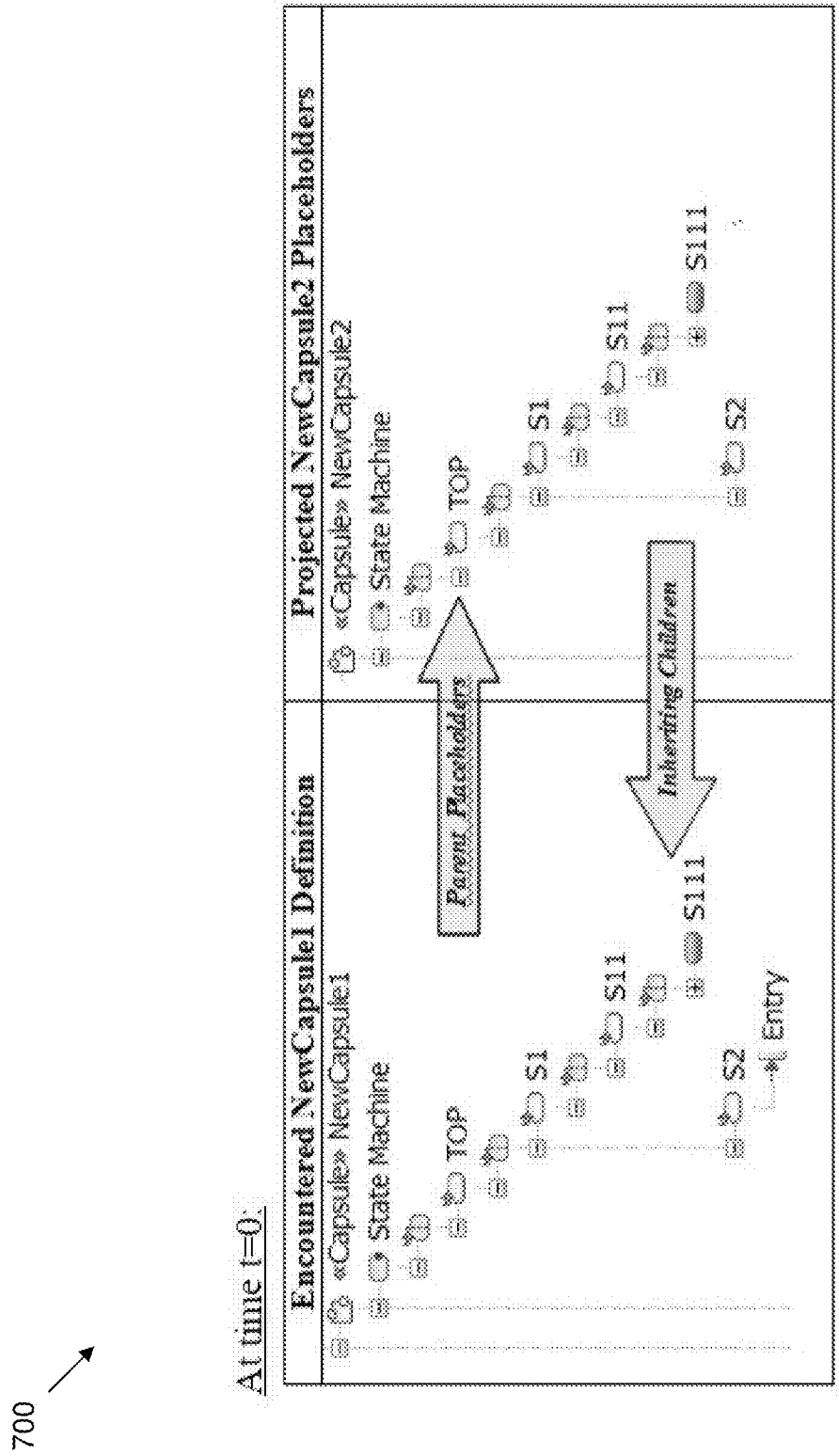
FIG. 7 illustrates a class diagram of the example input model at t=0.

FIG. 6 illustrates a class diagram 600 of an example textual input model. FIG. 7 illustrates a class diagram 700 of the example input model at t=0. At first, the ERF encounters Encountered NewCapsule1. During the encounter, NewCapsule1 is super in that it has not yet encountered NewCaspule2. In addition, a redefinition of S11 is encountered in NewCapsule1, since S111 is added. Redefinition of S2 is also encountered since an entry action is added. Since S11 has been redefined, a state diagram definition exists for S11 and as well as all the containing state diagrams. Consequently, there is mention of NewCapsule1, State Machine, TOP, S1, S11 and S111. There is also a mention of S2, since it defined on the State diagram for TOP, along with S1. Next, the ERF projects the super (i.e. NewCapsule2) based on information from state diagrams of NewCapsule1. Containment hierarchy and inheritance hierarchy created for NewCapsule1 and NewCapsule2 is based on the diagramming information from NewCapsule1 and hence presently they are alike. As such, for resolution at time t=0, the UML Capsule corresponding to NewCapsule1 is generated. At t=0, a State Machine and any of the nested contents are not created, since NewCapsule2's State Machine (super) has not been encountered.

Figure 8:
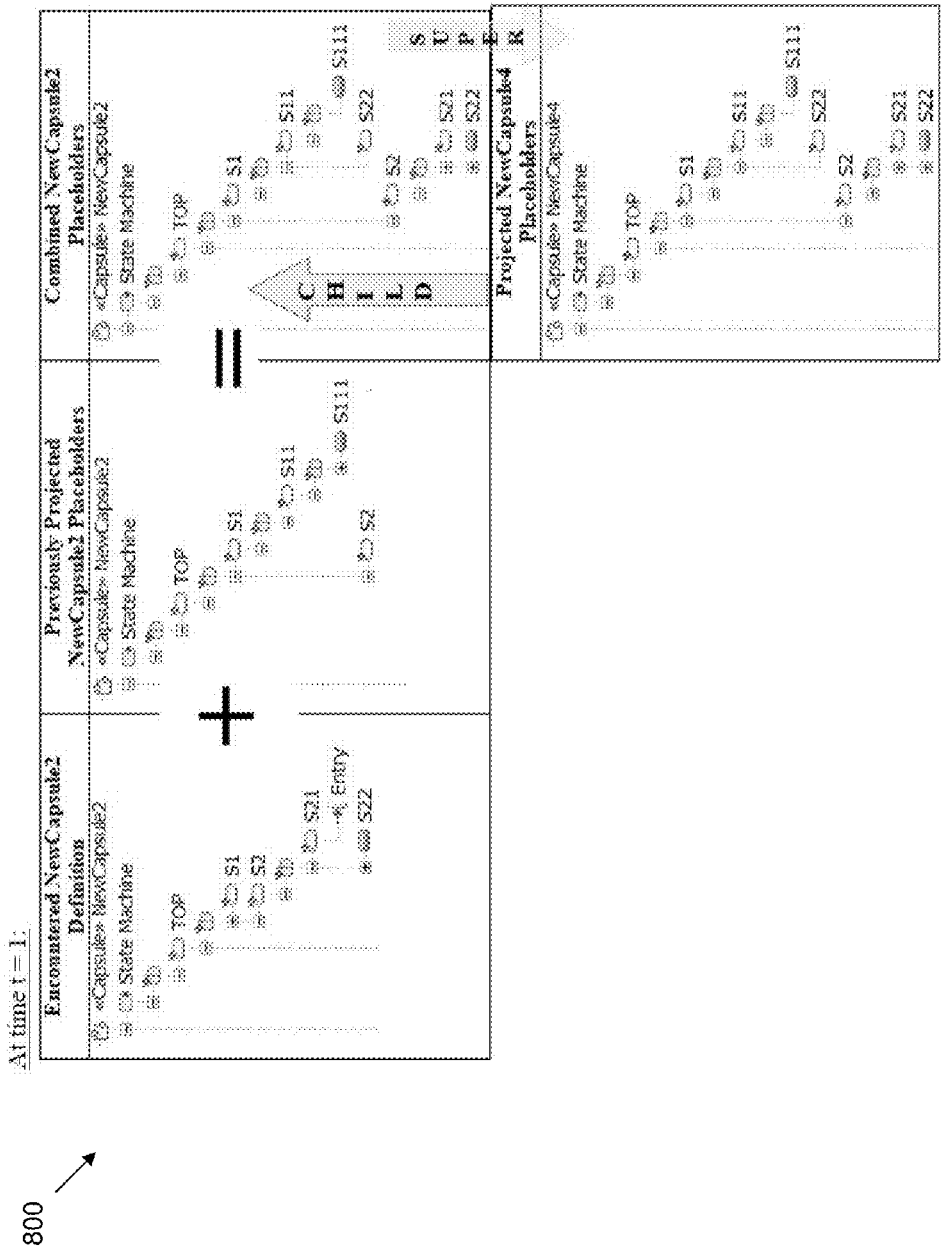
FIG. 8 illustrates a class diagram of the example input model at t=1.

FIG. 8 illustrates a class diagram 800 of the example input model at t=1. At first, the ERF encounters NewCapsule2, whose super i.e. NewCaspule4 is not yet encountered. In addition, a redefinition of S2 is encountered since added entry action to S21 as well as a new local state S22. State Diagrams for NewCapsule2, include all state diagrams up to the addition of S22. Consequently, there is the mention of NewCapsule2, State Machine, TOP, S1, S2, S21 and S22. Additional elements i.e. (S1, S11 and S111) are learned from the subclasses that require them. As such, NewCapsule2's ElementReference contains the addition of the learned Element References and the encountered elements and these are all projected to NewCapsule4. Containment hierarchy and inheritance hierarchy created for NewCapsule4 and NewCapsule2 are based on the diagramming information. For resolution at t=1, a UML Capsule corresponding to NewCapsule2 is created. In addition, the ERF is unable to create a State Machine and any of the nested contents, since NewCapsule4 has not been encountered.

Figure 9:
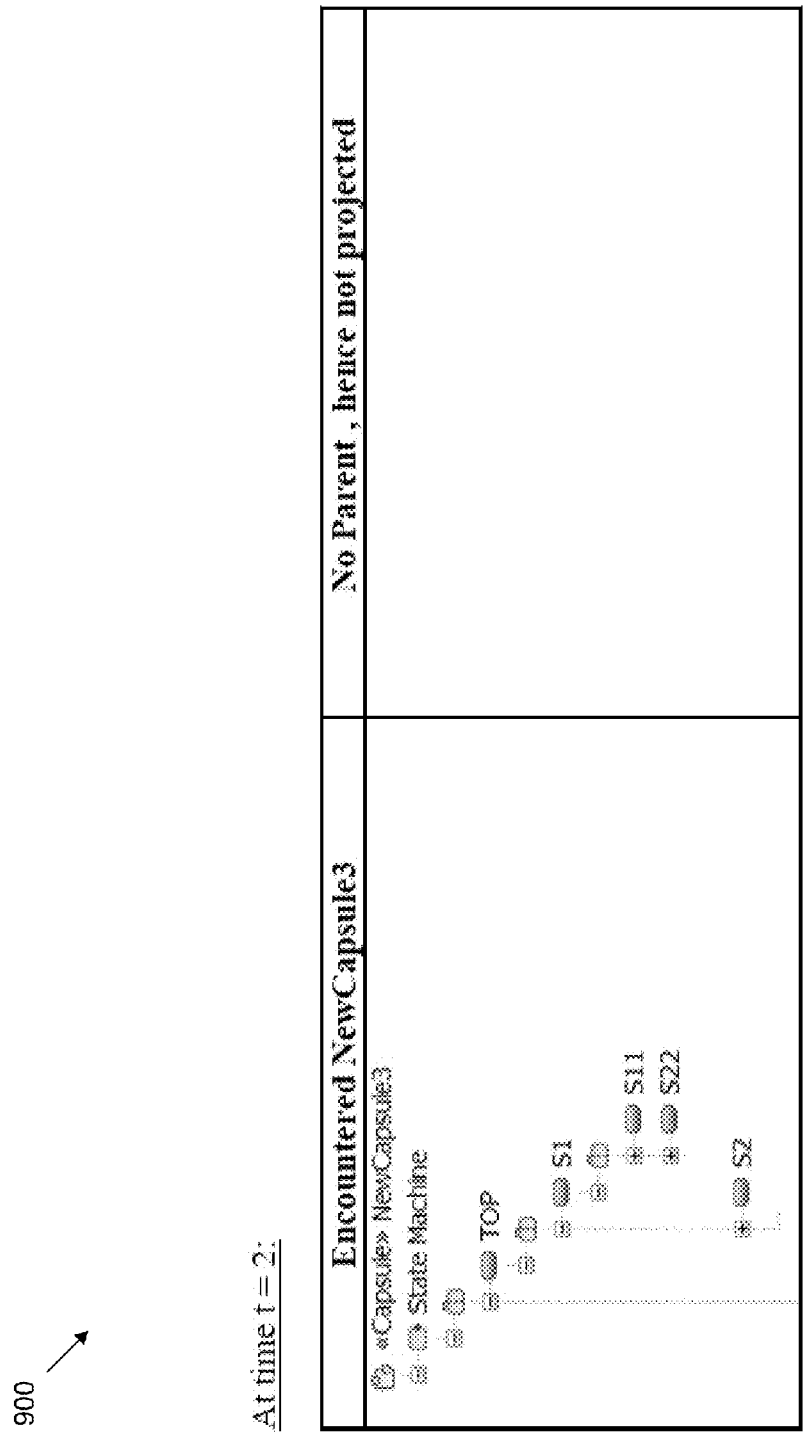
FIG. 9 illustrates a class diagram of the example input model at t=2.

FIG. 9 illustrates a class diagram 900 of the example input model at t=2. At first, the ERF encounters NewCapsule3. No projection is implemented since NewCapsule3 does not have a super. The ERF cannot complete the inheritance hierarchy because of a missing link (i.e. NewCapsule4), and NewCapsule3 does not know that it is the super of NewCapsule4. As such, the ERF creates all the ElementReferences for NewCapsule3 based on semantic definitions which is equivalent to what it has in its diagrams definitions. As such, for the resolution at t=2, a UML Capsule is created corresponding to NewCapsule3. A UML State Machine and all other States on encountering definitions are created, since they don't depend upon any inheriting contexts. The NewCapsule3 is unable to pass the states along to sub-elements since it is not aware of any children that inherit from it.

Figure 10:
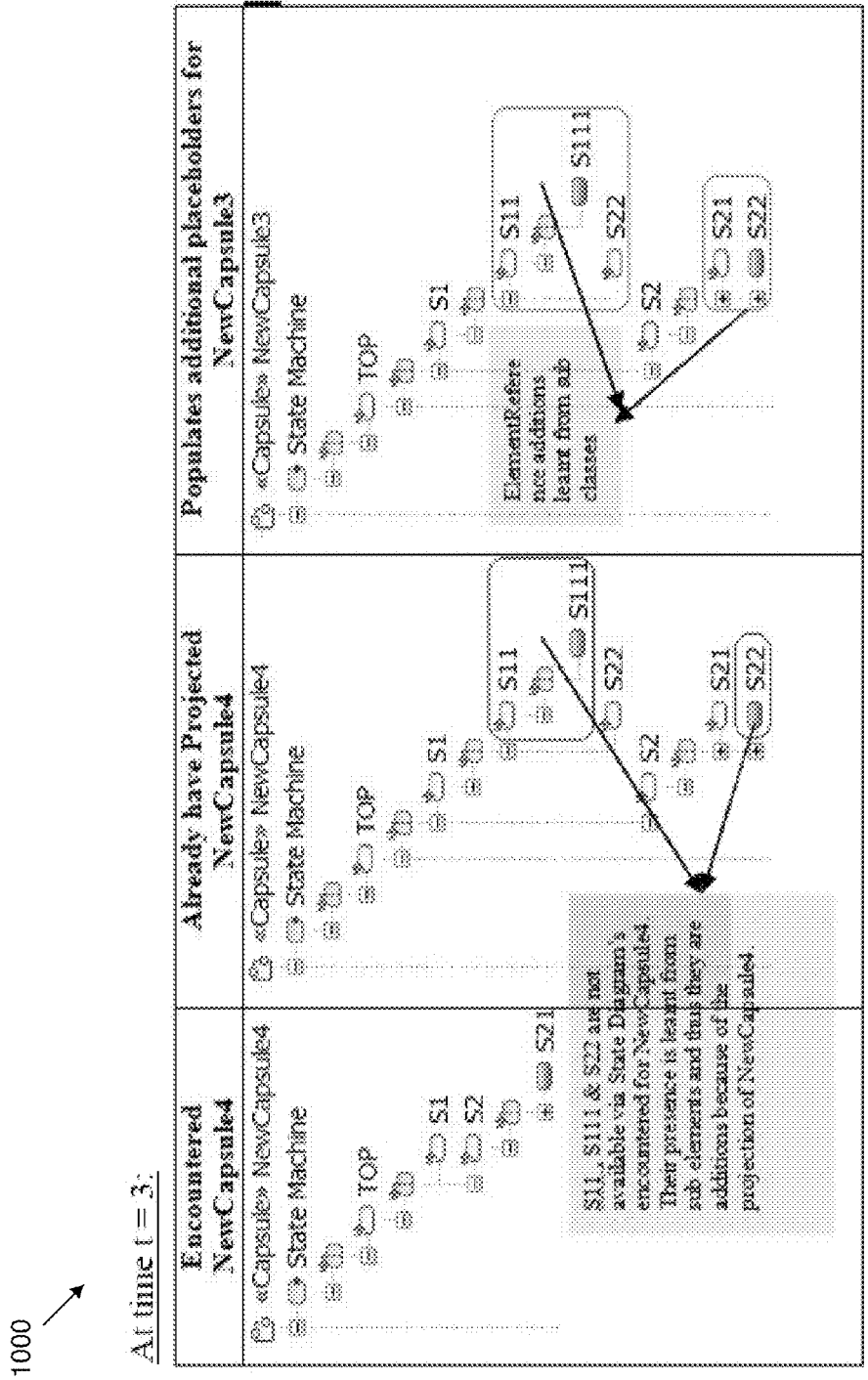
FIG. 10 illustrates a class diagram of the example input model at t=3.

FIG. 10 illustrates a class diagram 1000 of the example input model at t=3. At first, the ERF encounters NewCapsule4. The ERF redefines S2 by defining a new nested state S21. Since NewCapsule3 (i.e. the super for NewCapsule4 is already present), NewCapsule4 does not need to create many of the ElementReference placeholders for NewCapsule3. NewCapsule4 attempts to create linkability (i.e., child parent inheritance relation) for elements not encountered in NewCapsule3. As such, for the resolution at t=3, a UML Capsule corresponding to NewCapsule4 is created. Since NewCapsule4 has its parent's state machine defined, NewCapsule4 can redefine its inheriting State Machine. As NewCapsule4 comes across diagramming information, NewCapsule4 creates linkability to its parent, obtains the associated imported UML element, and calls its resolvers in order to complete its view bindings as well as for creating nested locally defined states, in this case S21 which it creates on finding S2 from its parent. S2 is then passed to its children (sub contexts) and they call their revolvers, and pass S2 down further. As such, elements available up the inheritance chain are passed down to sub elements lower in the chain, each calling its resolvers which further created locally defined elements, hence completing importing and inter reference resolution.

Figure 11:
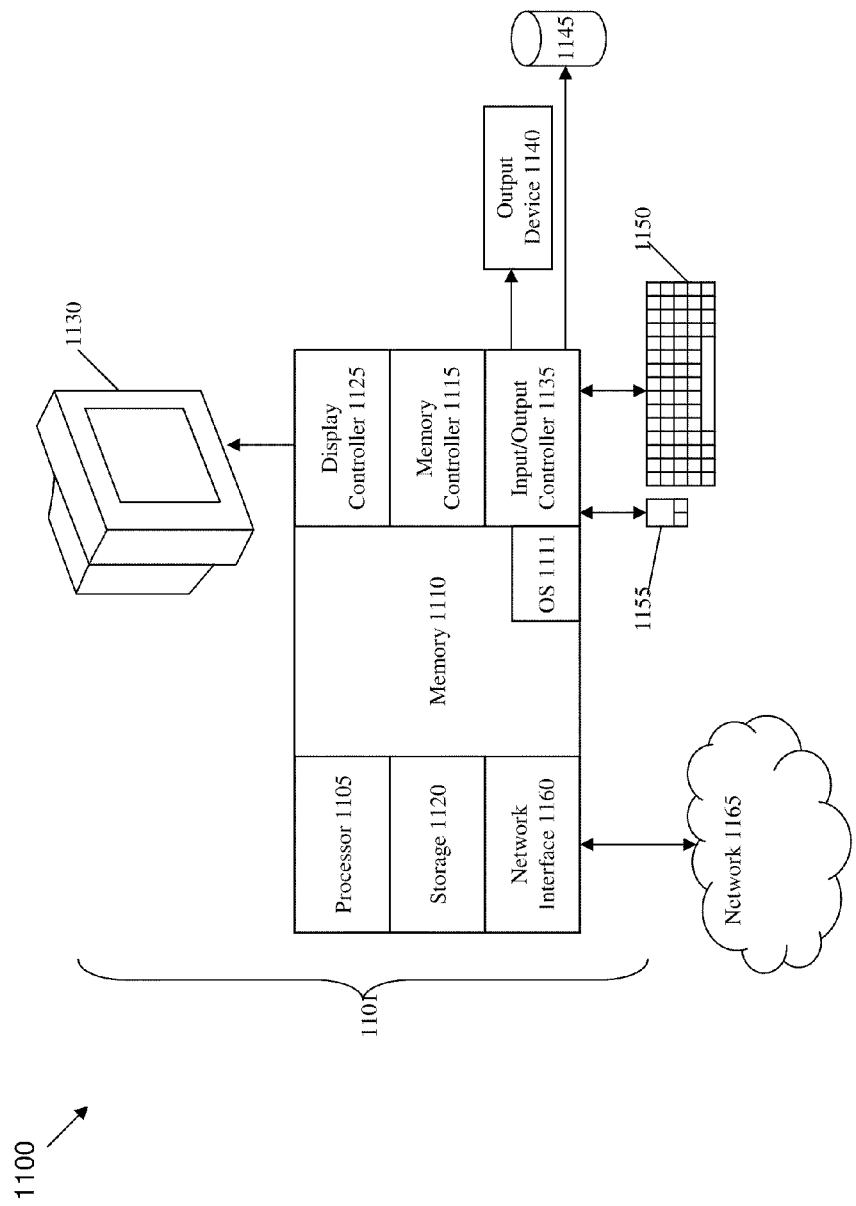
FIG. 11 illustrates an exemplary embodiment of a system for importing system behavior models into a UML based meta model representation.

The methods described herein can be implemented in any exemplary computer system. For example, FIG. 11 illustrates an exemplary embodiment of a system 1100 for importing system behavior models into a UML based meta model representation. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1100 therefore includes general-purpose computer 1101.

In exemplary embodiments, in terms of hardware architecture, as shown in FIG. 11, the computer 1101 includes a processor 1105, memory 1110 coupled to a memory controller 1115, and one or more input and/or output (I/O) devices 1140, 1145 (or peripherals) that are communicatively coupled via a local input/output controller 1135. The input/output controller 1135 can be, but is not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1105 is a hardware device for executing software, particularly that stored in memory 1110. The processor 1105 can be any custom made or commercially available processor, a central processing unit (CPU), an auxiliary processor among several processors associated with the computer 1101, a semiconductor based microprocessor (in the form of a microchip or chip set), a macroprocessor, or generally any device for executing software instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1110 may incorporate electronic, magnetic, optical, and/or other types of storage media. Note that the memory 1110 can have a distributed architecture, where various components are situated remote from one another, but can be accessed by the processor 1105.

The software in memory 1110 may include one or more separate programs, each of which comprises an ordered listing of executable instructions for implementing logical functions. In the example of FIG. 11, the software in the memory 1110 includes the behavior model importation methods described herein in accordance with exemplary embodiments and a suitable operating system (OS) 1111. The operating system 1111 essentially controls the execution of other computer programs, such as the behavior model importation systems and methods as described herein, and provides scheduling, input-output control, file and data management, memory management, and communication control and related services.

The behavior model importation methods described herein may be in the form of a source program, executable program (object code), script, or any other entity comprising a set of instructions to be performed. When a source program, then the program needs to be translated via a compiler, assembler, interpreter, or the like, which may or may not be included within the memory 1110, so as to operate properly in connection with the OS 1111. Furthermore, the behavior model importation methods can be written as an object oriented programming language, which has classes of data and methods, or a procedure programming language, which has routines, subroutines, and/or functions.

In exemplary embodiments, a conventional keyboard 1150 and mouse 1155 can be coupled to the input/output controller 1135. Other output devices such as the I/O devices 1140, 1145 may include input devices, for example but not limited to a printer, a scanner, microphone, and the like. Finally, the I/O devices 1140, 1145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1100 can further include a display controller 1125 coupled to a display 1130. In exemplary embodiments, the system 1100 can further include a network interface 1160 for coupling to a network 1165. The network 1165 can be an IP-based network for communication between the computer 1101 and any external server, client and the like via a broadband connection. The network 1165 transmits and receives data between the computer 1101 and external systems. In exemplary embodiments, network 1165 can be a managed IP network administered by a service provider. The network 1165 may be implemented in a wireless fashion, e.g., using wireless protocols and technologies, such as WiFi, WiMax, etc. The network 1165 can also be a packet-switched network such as a local area network, wide area network, metropolitan area network, Internet network, or other similar type of network environment. The network 1165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1101 is a PC, workstation, intelligent device or the like, the software in the memory 1110 may further include a basic input output system (BIOS) (omitted for simplicity). The BIOS is a set of essential software routines that initialize and test hardware at startup, start the OS 1111, and support the transfer of data among the hardware devices. The BIOS is stored in ROM so that the BIOS can be executed when the computer 1101 is activated.

When the computer 1101 is in operation, the processor 1105 is configured to execute software stored within the memory 1110, to communicate data to and from the memory 1110, and to generally control operations of the computer 1101 pursuant to the software. The behavior model importation methods described herein and the OS 1111, in whole or in part, but typically the latter, are read by the processor 1105, perhaps buffered within the processor 1105, and then executed.

When the systems and methods described herein are implemented in software, as is shown in FIG. 11, the methods can be stored on any computer readable medium, such as storage 1120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the behavior model importation methods are implemented in hardware, the behavior model importation methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include a reduction in both memory footprint and time to completion in the importing of textual models. Technical effects further include resolution of element references. Consequently the solution is more scalable and more suited for importing enterprise models to UML2.1. The technical effects are a result of the characteristics of the ERF a now described. Only a single parse through the input model file is commented, hence I/O is minimized and therefore performance is drastically increased. A much smaller memory footprint of the importer is included, since absolute paths of elements are not stored, but instead elements are defined using just a simple name (with its kind) in a tree structure. As such, nested neighboring states, :TOP:S1:S11:S111:SA, :TOP:S1:S11:S111:SB and :TOP:S1:S11:S111:SC, have a treed structure of TOP:S1:S11:S111 with siblings SA, SB and SC. No derivation of fully qualified name is required either when an element is encountered or when a reference is resolved. The Element Reference node creation handles the derivation. This feature again adds to performance. Element reference resolution happens on the fly, as and when an element becomes available, since there are resolvers listening, awaiting the imported element to be created and on finding it resumes its work. Encountering an unordered inheritance hierarchy are handled, since inheritance chains are built dynamically. On encountering any sub element, the importer deftly adds it in the hierarchy as a missing piece of the structure. A strategy of passing up a proxy placeholder up its generalization chain to the known classes is employed. As such, broken inheritance chain pieces exist at their super classes and contain all the placeholders learned from its subclasses. When a class is encountered that joins two pieces of a hierarchy, these placeholders are further passed up the chain.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for inputting a textual model having a plurality of elements, the method comprising:

parsing through the textual model for the plurality of elements;

searching for at least one of an element semantic definition, one or more element view definitions corresponding to a semantic definition, and an element view containing diagram definition within the textual model for each of the plurality of elements;

generating element reference nodes as placeholders for placement on an internally constructed custom tree;

attaching a listener to each of the element reference nodes, wherein the listener is configured to await population of the element reference node with an equivalent unified modeling language semantic element, wherein a listener awaiting population is an awaiting sequenced listener;

completing an inheritance hierarchy between the element reference nodes up to a parent node inferred from the diagramming definitions; and resolving awaiting sequenced listeners that are made aware of an awaited unified modeling language value, including dynamically resolving views prior to semantic completion.

2. The method as claimed in claim 1 wherein the internally constructed custom tree is identified with a unique multi-valued hash key in a customized hash map tree reflecting a containment hierarchy while preserving the inheritance hierarchy and maintaining an association to the element reference nodes from numerous views that exist across multiple diagrams.

3. The method as claimed in claim 1 further comprising in response to encountering the element semantic definition, setting a unified modeling language value in the element reference node.

4. The method as claimed in claim 1 further comprising:
in response to encountering the element view definition, retrieving a unified modeling language value from the inheritance hierarchy; and
setting the unified modeling language value in the element reference node.

5. The method as claimed in claim 1 wherein the constituent views in a diagram definition that correspond to semantic elements facilitate in creating linking relationship between nodes in the internally constructed custom tree.

6. The method as claimed in claim 5 further comprising completing the inheritance hierarchy based on the linking relationship between the nodes in the internally constructed custom tree.

7. The method as claimed in claim 1 wherein parsing through the textual model for the plurality of elements occurs only once.

8. The method as claimed in claim 1 wherein resolving awaiting sequenced listeners that are made aware of the awaited unified modeling language value is due to at least one of encountering semantic definition, and inheritance linkability completion facilitated by diagram definitions.

9. A non-transitory computer program product for inputting a textual model having a plurality of elements, the non-transitory computer program product including instructions for causing a computer to implement a method, the method comprising:
parsing through the textual model for the plurality of elements;
searching for at least one of an element semantic definition, one or more element view definitions corresponding to a semantic definition, and an element view containing diagram definition within the textual model for each of the plurality of elements;
generating element reference nodes as placeholders for placement on an internally constructed custom tree;
attaching a listener to each of the element reference nodes, wherein the listener is configured to await population of the element reference node with an equivalent unified modeling language semantic element, wherein a listener awaiting population is an awaiting sequenced listener;
completing an inheritance hierarchy between the element reference nodes up to a parent node inferred from the diagramming definitions; and
resolving awaiting sequenced listeners that are made aware of an awaited unified modeling language value, including dynamically resolving views prior to semantic completion.

10. The computer program product as claimed in claim 9 wherein the internally constructed custom tree is identified with a unique multi-valued hash key in a customized hash map tree reflecting a containment hierarchy while preserving the inheritance hierarchy and maintaining an association to the element reference nodes from numerous views that exist across multiple diagrams.

11. The computer program product as claimed in claim 9 wherein the method further comprises in response to encountering the element semantic definition, setting a unified modeling language value in the element reference node.

12. The computer program product as claimed in claim 9 wherein the method further comprises:
in response to encountering the element view definition, retrieving a unified modeling language value from the inheritance hierarchy; and
setting the unified modeling language value in the element reference node.

13. The computer program product as claimed in claim 9 wherein the element diagram definition includes a linking relationship between nodes in the internally constructed custom tree.

14. The computer program product as claimed in claim 13 wherein the method further comprises completing the inheritance hierarchy based on the linking relationship between the nodes in the internally constructed custom tree.

15. The computer program product as claimed in claim 9 wherein parsing through the textual model for the plurality of elements occurs only once.

16. The computer program product as claimed in claim 9 wherein resolving awaiting sequenced listeners that are made aware of the awaited unified modeling language value is due to at least one of encountering semantic definition, and inheritance linkability completion facilitated by diagram definitions.

17. A system for inputting a textual model having a plurality of elements, the system comprising:
a processor configured to:
parse through the textual model for the plurality of elements;
search for at least one of an element semantic definition, one or more element view definitions corresponding to a semantic definition, and an element view containing diagram definition within the textual model for each of the plurality of elements;
generate element reference nodes as placeholders for placement on an internally constructed custom tree;
attaching a listener to each of the element reference nodes, wherein the listener is configured to await population of the element reference node with an equivalent unified modeling language semantic element, wherein a listener awaiting population is an awaiting sequenced listener;
complete an inheritance hierarchy between the element reference nodes up to a parent node inferred from the diagramming definitions; and
resolve awaiting sequenced listeners that are made aware of an awaited unified modeling language value.

18. The system as claimed in claim 17 wherein in response to encountering the element semantic definition, the processor sets a unified modeling language value in the element reference node.

19. The system as claimed in claim 17 wherein in response to encountering the element view definition, the processor retrieves a unified modeling language value from the inheritance hierarchy and sets the unified modeling language value in the element reference node.

20. The system as claimed in claim 17 wherein in response to encountering the element diagram definition, the processor completes the inheritance hierarchy based on a linking relationship between the nodes in the internally constructed custom tree.

* * * * *